Dec. 5, 1950            H. LAMB            2,532,560
MECHANISM FOR STRAINING PAINT AND THE LIKE
Filed Feb. 14, 1948            3 Sheets-Sheet 1
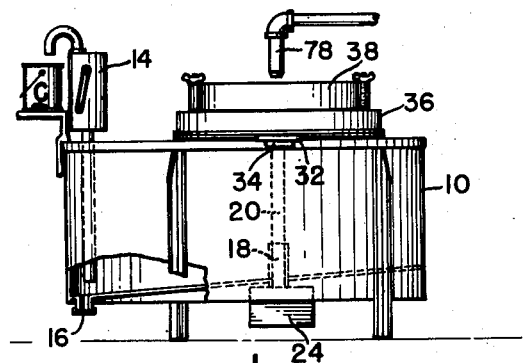
FIG__1
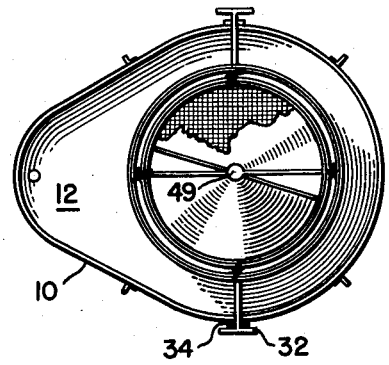
FIG__2
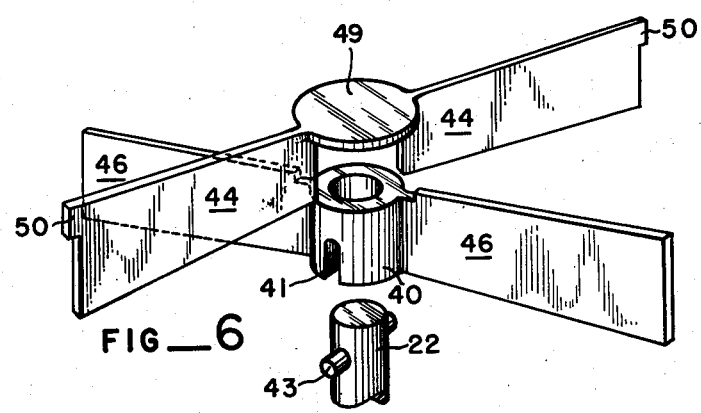
FIG__6
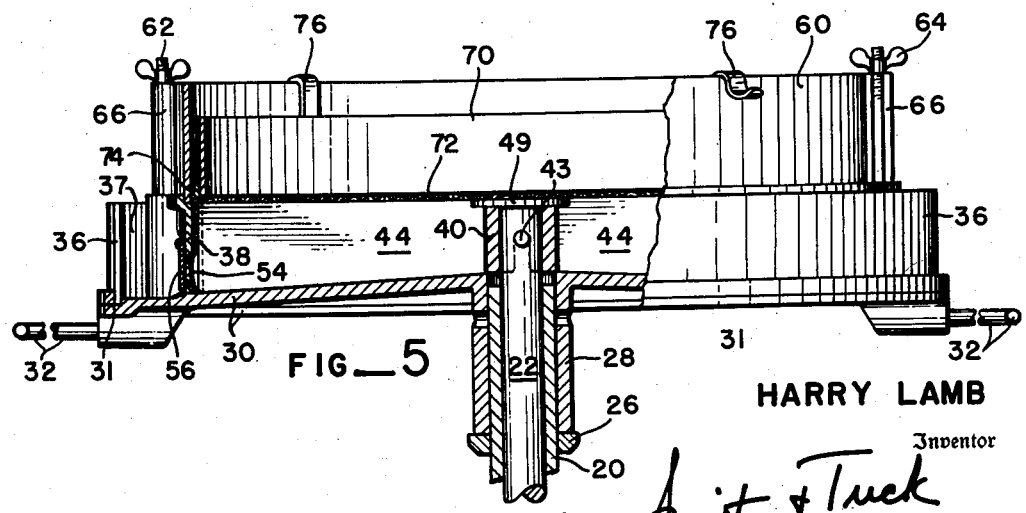
FIG__5
HARRY LAMB
Inventor
Smith & Tuck
Attorneys

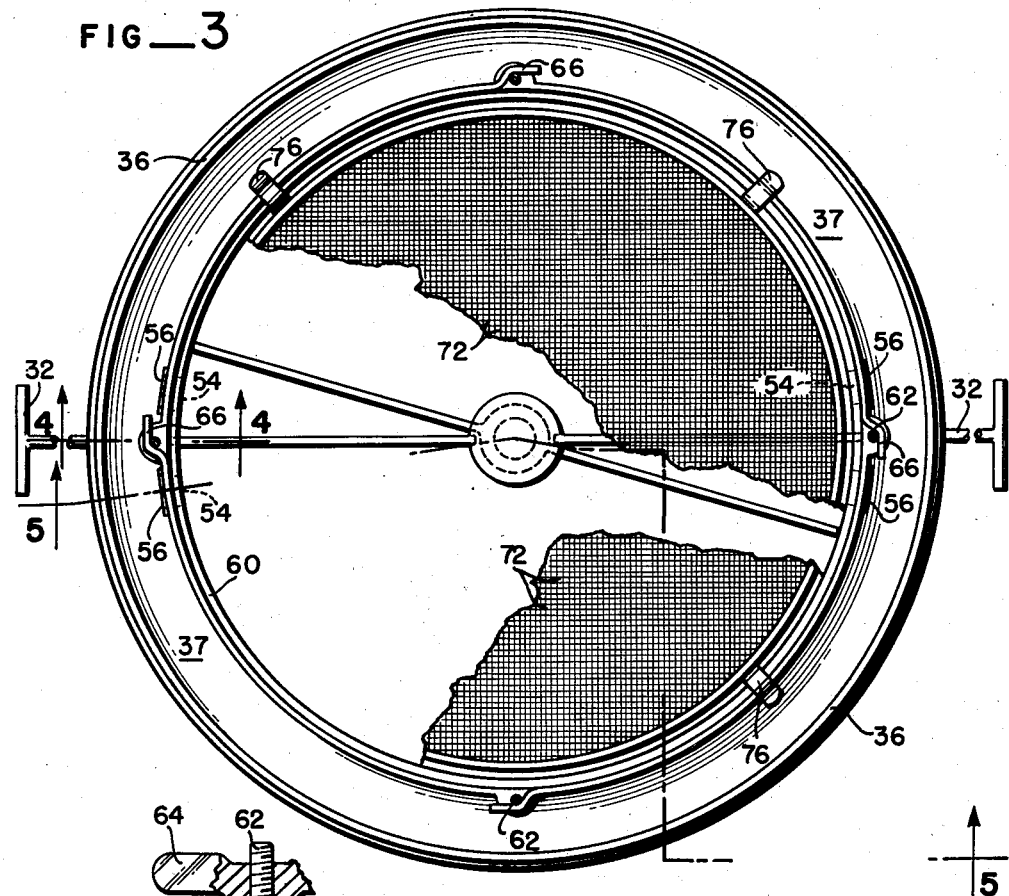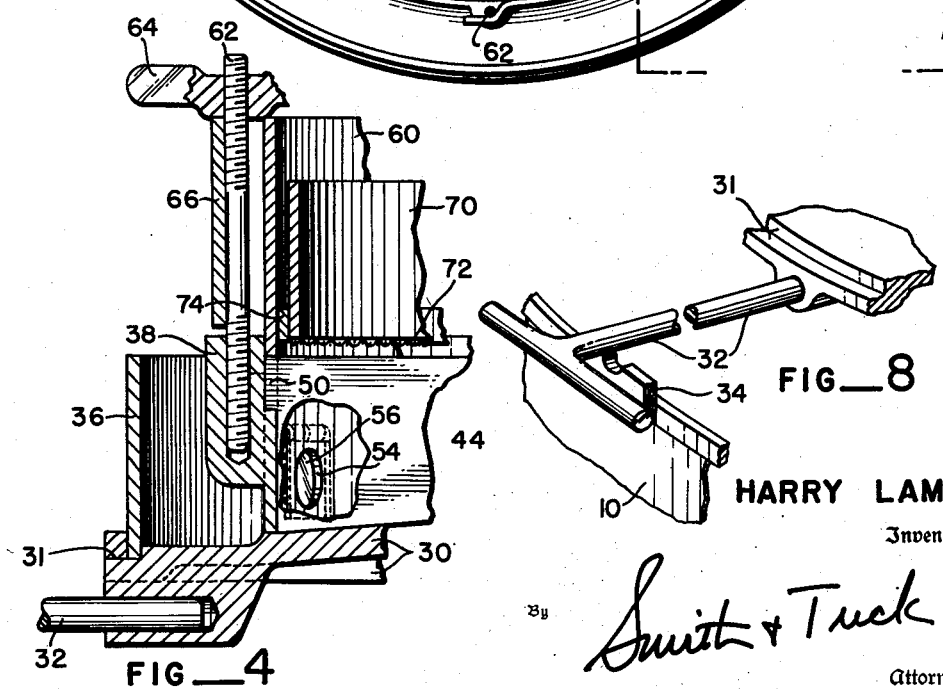

Dec. 5, 1950           H. LAMB           2,532,560
MECHANISM FOR STRAINING PAINT AND THE LIKE
Filed Feb. 14, 1948           3 Sheets-Sheet 3
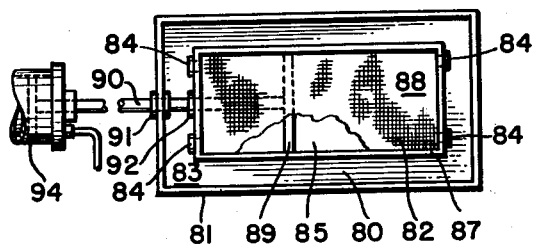
FIG_7
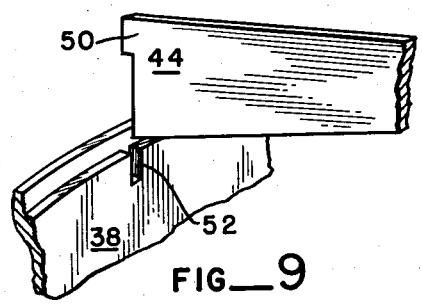
FIG_9
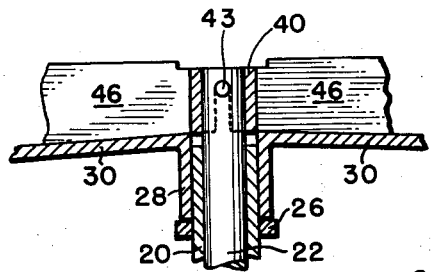
FIG_10
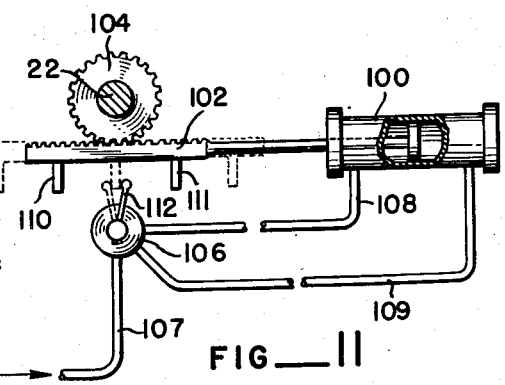
FIG_11
HARRY LAMB
Inventor
By
Attorneys Patented Dec. 5, 1950

2,532,560

UNITED STATES PATENT OFFICE 2,532,560

MECHANISM FOR STRAINING PAINT
AND THE LIKE

Harry Lamb, Madison, Wis., assignor to C. M. Ambrose Co., Inc., Seattle, Wash., a corporation of Washington Application February 14, 1948, Serial No. 8,376

6 Claims. (Cl. 210—152)

This invention relates to a mechanism for straining paint and the like and, more particularly, to the art of opening particle-closing strainer elements to facilitate the passage of the fluid being treated.

Considering the application of this invention to the field of paint straining, as a specific and very illustrative problem, but without intention to thereby limit the invention, it is found that the compounding and mixing of paint vehicles, solvents and pigments results in a fluid of relatively high viscosity that often includes particles that must be strained in order to insure a suitable product. The removal of the particles, in the past, has been to a degree accomplished by gravitational straining, by passing the fluid downward through a screen. As the particles being separated accumulate on the upper screen surface they tend to close the screen and slow the operation by holding back the following fluid. The problem is particularly aggravated in an operation of large volume conducted more or less continuously, and about the only practical solution has been to terminate the screening and clean off the strainer when the flow is so slow as to retard materially can filling or other operations conducted thereafter. This means a shut-down and clean-up stage that seriously disrupts the operation of the manufacturing plant and is an inconvenience that is highly desirable to preclude.

Having in mind these and other difficulties, it has been an important object of this invention to provide a method of and apparatus for straining paint and similar fluids which permits substantially continuous straining while precluding frequent and interrupting screen cleaning operations.

Another object of the invention is the provision of a method of and mechanism for straining paint and the like, which insures an agitation of the paint above the strainer to keep the strainer open and operable but without foaming of the fluid unduly.

A further object of the invention resides in the provision of a strainer mechanism for paint fluids and the like which will operate substantially continuously in an efficient manner and without the employment of elaborate and complicated mechanism and the difficulties that usually attend such.

Still another object of the invention is to provide a strainer mechanism for paint and like fluids which is simple to construct and operate and may be disassembled with ease and convenience for cleaning and servicing.

One other object of the invention lies in the provision, in a continuously operable strainer mechanism as described, of a method and mechanism in which the strained particles are removed from the straining element and accumulated in a manner to be out of the way of the straining operation and convenient for ready removal if the accumulation tends to interfere with straining.

Other and more specific objects and advantages of the invention will be apparent during the discourse of the following detailed description of the invention and its operation.

In the accompanying drawings, forming a part of this specification, and in which like numerals designate like parts throughout the same, Fig. 1 is a view in elevation of a strainer mechanism embodying my invention;

Fig. 2 is a plan view of the mechanism of Fig. 1;

Fig. 3 is an enlarged plan view of the strainer per se, with portions broken away for convenience of illustration;

Fig. 4 is an enlarged sectional view taken on line 4—4 of Fig. 3;

Fig. 5 is an elevational view, partially in section, taken on line 5—5 of Fig. 3;

Fig. 6 is a perspective view of the fixed and movable walls employed in sub-dividing a chamber in the strainer mechanism below the strainer sheet;

Fig. 7 is a plan view of an alternate form of the invention;

Fig. 8 is a detailed perspective view of a base plate handle bar and its cradle on the tank edge;

Fig. 9 is a fragmentary perspective view of a portion of the upper tank edge and the fixed wall;

Fig. 10 is a vertical sectional view of the operating shaft of the mechanism; and Fig. 11 is a schematic view of the servo-mechanism which reciprocates the impeller shaft of the strainer mechanism.

Ordinarily, in the paint manufacturing industry, an invention such as mine is embodied in structure that is associated with tanks or vats in view of the quantities of material handled and for the convenience of cleaning operations and the like. Accordingly, I show here a tank 10, of egg-shape, having a bottom 12, sloping to the smaller end and over which is mounted the strainer unit to discharge into the tank. Fluid is withdrawn from the tank 10 by pumping mechanism 14, as for filling a can C. The pump draws fluid up and out of the tank at its lower and smaller end. In the tank bottom at a low point is provided spigot 16, by which the tank may be drained.

A bushing or collar 18 is rigidly mounted upright in the center of the larger end of the tank bottom and supports the upstanding sleeve 20 which encloses shaft 22 that is coupled to an intermittent reversing mechanism, contained in casing 24, whereby the shaft is caused to rotatably oscillate about its axis slightly less than 180° of travel in each direction.

An annular ring or shelf 26, outstanding from sleeve 20 below its upper end, supports sleeve 28 depending from the underside of base-plate 30, which is here shown to be circular and to be disposed substantially horizontal. Base-plate 30 supports the main elements of the strainer mechanism, as will be more fully described later, and on occasion, is removable from the position on the upper end of the sleeve, as when cleaning or servicing is being performed. To facilitate removal of the base-plate and to aid in its support in the upper portion of the tank 10, I provide outstanding T-shaped handle bars 32, which extend sufficiently to rest in notches 34 formed in the edge of the tank.

The base-plate 30 is slightly conical so that fluid will tend to gravitate outward from the axis. The outer edge of the base-plate is grooved at 31 to receive an annular wall member 36, which is upstanding. Spaced inward from wall 36 is a second annular wall 38 which, with wall 36 and the portion of plate 30 therebetween forms a reservoir that, in this case, is annular in shape. Wall 38 has a pair of diametrically opposed notches 52 into which fit ears 50 of wall segments 44, as shown in Fig. 6. The segments 44 are joined above shaft 22 by a bridging element 49.

A hub 40, having a notch 41 to engage over the lateral pin 43 in the upper end of shaft 22, has diametrically positioned blades 46 on opposite sides. Reciprocatory oscillation of shaft 22 produces a like reciprocation of the blades 46 over the base-plate to which the lower edge of the blades fit rather closely in something like a wiping contact. A similar fit is obtained between the ends of the blades and wall 38. The blades 46 constitute, it can be seen, movable partitioning walls over the base plate. Each wall is confined to a separate chamber by means of the wall segments 44 that are fixedly mounted over the base plate between blades 46. Wall segments 44 are joined by member 49 that overlies hub 40, and at their ends have ears 50 which fit into notches 52 in wall 38. It will thus be seen that by so dividing the space enclosed above base plate 30 by annular wall 38, in effect, two semi-cylindrical chambers are formed and in each chamber is mounted a reciprocatory blade or septum wall that divides the chamber into two cells and that may swing through the chamber perpendicular to the curved wall 38.

In wall 38, on each side of the dividing walls 44, are formed openings 54 as shown in Figs. 3, 4, and 5. Each opening is equipped with a flap-valve element 56 which will swing outward to permit fluid to pass from within wall 38 to the reservoir outside that wall but at the same time prevent the reverse flow of such fluid. Thus, during rotary oscillation of shaft 22, the partitioning septum walls 46 reciprocate between a pair of openings in a to-and-fro-action that is slightly less than 180° of travel.

An annular wall extension 60 is superposed upon wall 38 (see Fig. 4) and there held by clamp screws 62 anchored at their lower ends in ring wall 38 and carrying at the upper ends thumb nuts 64. Wall extension 60 has several offset hooks 66 which engage the screws 62.

The strainer element is of basket-like form and comprises the rim wall 70 that has the screen material 72 stretched across its lower face where the same is held by means of clamping rim 74. Hooks 76 attached to wall 70 engage over the upper edge of wall extension 60 and suspend the screen in the desired plane over the movable wall members 46. It is desirable that the screen be superposed closely adjacent the upper edge of walls 46 for reasons more fully set forth hereinafter.

Paint or other strainable material is delivered to screen 72 by spigot 78 which may connect with other vats or lead from a mixing machine, or the like.

The alternate for a strainer mechanism shown in Fig. 7, comprises a base plate 80 around the periphery of which rises the wall 81 that, with the inner wall 82 and the portion of the base plate therebetween, forms the reservoir 83. Wall 82 has outlet openings 84, of the unidirectional type previously described which permit fluid to flow from within chamber 85 to the reservoir 83. Superposed on wall 82 is upper rim wall 87 which has, on its lower face, screen 88.

In chamber 85 and under screen 88 is mounted the upright movable partitioning wall 89, which reciprocates in a straight-line motion from end to end of the lower chamber. A shaft 90 passing through suitable guiding passages 91, 92, in walls 81 and 82 respectively, is attached on its inner end to wall 89 and is connected with the servomotor 94, whereby reciprocating motion is transmitted to the movable wall 89 to cause the same to sweep to and from the outlets of chamber 85 and under screen surface for the purposes described above.

In Fig. 11 is shown the mechanism for rotating reciprocally the shaft 22. Servo-motor 100 is coupled to rack 102 which engages pinion 104. The two-way valve 106 has supply line 107 connected thereto and feed line 108 and 109 connect from the valve to servo-motor 100. The valve operating handle 112 has two positions and is shifted from one to the other by lugs 110 and 111 carried by the rack. The travel of the rack is such that a rotating motion of less than 180° is imparted to shaft 22 for the reasons as stated elsewhere.

*Operation*

With the mechanism assembled as described, paint is delivered to the upper surface of the screen, where it will, under the force of gravity, tend to pass downward through the screen into the chamber thereunder. This chamber fills with the fluid which is to flow out the passages 54 into the reservoir 37, whence it departs over the upper lip or edge of wall 36 into the vat 10.

As the screen functions in straining the materials, those which do not pass the screen accumulate on the upper surface and in due time so reduce the functioning of the screen surface as to seriously retard the operation. It is to preclude such from happening that I have developed the present mechanism.

I have found that by applying an upward pressure to the bed of material resting on the screen, it is possible to lift off the screen this clogging material, and to open the interstices of the screen so that more material will pass therethrough. I have also found that such lifting action must be had repeatedly and intermittently, since the downward flow of material through the screen quickly tends to reclose the screen openings and reduce its functioning. Further, it has been found desirable to follow the lifting action with an immediate application of negative pressure to assist in the downward flow of strained fluid. To properly accomplish these steps, it is necessary to form a solid pool of fluid under the screen, as well as over it, and to then sweep the screen from the underside with a pressurized wave of fluid having an upward component, followed by a counter-acting zone of negative pressure. The upward effect lifts the accumulated bed of obstructing particles from the screen and the following suction draws down the material that will pass as the bed re-closes on the screen. This is best accomplished by reducing a sub-divided portion of the lower chamber while simultaneously increasing the size of a second portion of the chamber. The action is best when progressive across the screen underside.

A further action of merit and utility in this invention lies in moving laterally of the screen accumulated particles that have been lifted from the screen by the upward pressure. In other words, the particles that have been screened are raised and the pool in which they are found is caused to have a lateral current first toward one side and then the other. This results in the particles being constantly moved away from that area of the screen under which upward pressure is applied and toward certain portions of the screen that do not so positively receive the upward pressure. In this way a sludge of screened material is gradually accumulated in well defined areas where it is both out of the way and convenient for removal.

In the specific mechanism, I employ the partitioning septum wall, as 46, which is moved reciprocably through the chamber closely subjacent the screen 72 toward one opening 54 and away from the opposed outlet opening in the same chamber. Thus the valve element 56 of the opening being approached will swing away from the opening and permit fluid to pass into reservoir 37, while at the same time the opposite valve member will close its outlet opening due to the reverse suction applied to the valve element. The pressure on the fluid on the forward side of wall 46 also tends to force liquid upward through the screen and the negative pressure on the back side of wall 46 will operate upon the fluid above the screen and draw it downward through the screen.

It will be noted that movable walls 46 do not fully close with fixed walls 44 and that at the end of a sweep of a movable wall 46 there is a segmental or pie-shaped area of the screen 72 through which there is little or no upward pressure in the sense that such exists on the remainder of the screen. These areas, at each end of the path of travel of the movable septum or wall 46 accumulate screened particles and sludge-like masses that have previously lain on other and more active portions of the screen. Accumulation is obtained in this manner: Since the movable wall moves laterally in a horizontal manner it causes what appears to be an arcuate current or wave in the pool of fluid above the screen. This current carries the particles that have been raised off the screen laterally over the screen to the end of the stroke of the movable wall 46. The material constituting this wave or current tends to become quiescent at about the pie-shaped area referred to above and to a certain extent thickens as such lighter and strainable materials leave either through the screen therebelow or by flowing off in following the next wave or current created as the movable wall returns toward the other side of the screen. It is believed that this function or operation adds materially to the efficiency of the mechanism.

As the sludge thus tends to accumulate, observable and definitely defined pie-shaped areas of such sludge will gradually appear. In the case of the device of Fig. 3, the sludge areas of the path at each end of each blade or wall 46 appear to merge and overlie the ends of the fixed walls 44.

From the foregoing, it should be obvious that the upper pool is subjected to both an up-and-down reciprocating motion and a lateral reciprocation. The combination of these two motions insure that the screen will be capable of substantially continuous operation in straining and that the accumulated strained-out material will be removed from the principal scene of operation so as to reduce further hindrance to screening by material once removed.

I have found it preferable to have the fluid level of reservoir 37 substantially co-planar with the screen level in order that no voids within chambers occur, as otherwise foaming results and impedes the screening operation.

While I have shown and described particular embodiments of my invention, it will occur to those skilled in the art that various changes and modifications may be made without departing from the invention, and I therefore aim in the appended claims to cover all such changes and modifications as fall within the true spirit and scope of my invention.

Having thus described my invention, I claim:

1. A mechanism for straining paint fluids and the like, comprising: wall means forming a relatively flat and broad chamber the upper wall of which is foraminous; wall means for containing and pooling fluid to be strained above said chamber and upon said upper foraminous wall; an upright septum for completely dividing said chamber into a pair of laterally adjacent cells, said septum being reciprocally movable horizontally to progressively increase the lateral dimensions of one cell while at the same time decreasing the lateral dimensions of the other cell; means for reciprocally moving said septum horizontally; said cells each having a unidirectional outlet means of a capacity to permit the outflow of fluid from the cell at a rate to insure a slight pressure upon the fluid in front of the advancing septum.

2. The structure according to claim 1 in which there is means exterior of said chamber to pool the outflow from said cells to a depth at least equal to the height of said chamber.

3. The structure according to claim 1 in which the chamber is semi-cylindrical in shape and the septum is radially movable therein about an axis substantially coinciding with the center of generation of the arcuate wall of said chamber.

4. The structure according to claim 1 in which the unidirectional outlet means from each cell comprises a flap valve.

5. A mechanism for straining paint fluids and the like, comprising: wall means forming a relatively flat and broad hollow housing of cylindriform, the upper wall of which housing is foraminous; wall means for containing and pooling fluid to be strained above said housing and upon said foraminous wall; an upright septum beneath said foraminous wall diametrically and completely dividing said housing into a pair of chambers, said septum being radially reciprocal in said housing in a horizontal path of less than 180° in extent; an upright non-movable radial wall completely dividing each chamber from the axis of the septum outward into a pair of cells; said septum during radial reciprocation and with said non-movable walls causing the progressive decrease in the lateral dimensions of a cell on one side of the septum while at the same time causing a progressive increase in the lateral dimensions of a cell on the other side of the septum; means for radially reciprocating said upright septum horizontally within said housing; and each said cell having an unidirectional outlet means of a capacity to permit the outflow of fluid from the cell during advancing movement of the septum at a rate to insure a slight pressure upon the fluid in front of the advancing septum.

6. The structure according to claim 5 in which there is means exterior of the housing to pool the outflow fluid from said cells to a depth at least equal to the height of said cells and the portion of the foraminous wall.

HARRY LAMB.

REFERENCES CITED

The following references are of record in the file of this patent:

UNITED STATES PATENTS

| Number | Name | Date |
|---|---|---|
| 325,835 | Henderson | Sept. 8, 1885 |
| 449,271 | Praks | Mar. 31, 1891 |
| 612,027 | Ferris | Oct. 11, 1898 |
| 719,913 | Wackerow | Feb. 3, 1903 |
| 800,992 | Derham | Oct. 3, 1905 |
| 871,046 | Savage | Nov. 12, 1907 |
| 1,647,799 | Hammer | Nov. 1, 1927 |
| 1,686,017 | Lovet | Oct. 2, 1928 |

FOREIGN PATENTS

| Number | Country | Date |
|---|---|---|
| 228,750 | Great Britain | Feb. 12, 1925 |